US008974618B1

(12) United States Patent
Rotter et al.

(10) Patent No.: US 8,974,618 B1
(45) Date of Patent: Mar. 10, 2015

(54) SYSTEMS AND METHODS FOR ASSEMBLING A SKIN OF A COMPOSITE STRUCTURE

(71) Applicant: The Boeing Company, Seal Beach, CA (US)

(72) Inventors: Daniel M. Rotter, Lake Forest Park, WA (US); Paul Chih-Yung Chang, Woodinville, WA (US); Brad A. Coxon, Everett, WA (US); Paul E. Nelson, University Place, WA (US); Kimberlee Madden, Redmond, WA (US); Henry Macias, Auburn, WA (US); Jennifer Sue Noel, Kent, WA (US); Eugene H. Jeppesen, Kent, WA (US); Kurtis S. Willden, Kent, WA (US); Arvid J. Berg, Seattle, WA (US); Richard V. Phillips, Enumclaw, WA (US); Stephen Lee Metschan, Black Diamond, WA (US); Stephen K. Kirchmeier, Bothell, WA (US); Joseph D. Anderson, Seattle, WA (US); Scott A. Boner, North Bend, WA (US)

(73) Assignee: The Boeing Company, Chicago, IL (US)

( * ) Notice: Subject to any disclaimer, the term of this patent is extended or adjusted under 35 U.S.C. 154(b) by 34 days.

(21) Appl. No.: 13/693,887

(22) Filed: Dec. 4, 2012

(51) Int. Cl.
*B29C 65/00* (2006.01)
*B29C 65/70* (2006.01)

(52) U.S. Cl.
CPC ...................................... *B29C 65/70* (2013.01)
USPC ........... 156/214; 156/196; 156/212; 156/221; 156/222; 156/285

(58) Field of Classification Search
CPC .................... B29C 70/30; B29C 70/34; B29C 2043/34–2043/3422
USPC ......... 156/196, 212, 214, 221, 222, 285, 295, 156/493, 581; 264/101, 102, 241, 250, 257, 264/511, 571
See application file for complete search history.

(56) References Cited

U.S. PATENT DOCUMENTS

| 2,679,278 | A | 5/1954 | Clark |
| 7,228,611 | B2 | 6/2007 | Anderson et al. |
| 7,527,222 | B2 | 5/2009 | Biornstad et al. |
| 7,624,488 | B2 | 12/2009 | Lum et al. |
| 7,879,177 | B2 | 2/2011 | McCowin et al. |
| 8,043,554 | B2 * | 10/2011 | Yip et al. ...................... 264/573 |

(Continued)

OTHER PUBLICATIONS

U.S. Appl. No. 13/626,452, filed Sep. 25, 2012, Robins et al.

*Primary Examiner* — John Goff
*Assistant Examiner* — Carson Gross
(74) *Attorney, Agent, or Firm* — DASCENZO Intellectual Property Law, P.C.

(57) ABSTRACT

Systems and methods for assembling a skin of a composite structure on an outer surface of an inner mold line layup mandrel. The systems and methods include receiving a plurality of ply kits, assembling the plurality of ply kits to form a skin segment that defines a portion of the skin, and affixing the skin segment to the outer surface of the layup mandrel. The assembling includes transferring a respective ply kit of the plurality of ply kits to a non-planar transfer tool, compacting the respective ply kit on the non-planar transfer tool, and repeating the transferring and the compacting for each ply kit in the plurality of ply kits to form the skin segment.

20 Claims, 7 Drawing Sheets

(56) References Cited

U.S. PATENT DOCUMENTS

| | | |
|---|---|---|
| 8,157,212 B2 | 4/2012 | Biornstad et al. |
| 8,168,023 B2 | 5/2012 | Chapman et al. |
| 8,182,628 B2 | 5/2012 | Biornstad et al. |
| 2009/0148647 A1* | 6/2009 | Jones et al. ............... 428/58 |
| 2010/0011580 A1 | 1/2010 | Brennan et al. |
| 2010/0012260 A1 | 1/2010 | Brennan et al. |
| 2010/0078126 A1* | 4/2010 | Brennan et al. .......... 156/286 |
| 2011/0259515 A1* | 10/2011 | Rotter et al. ............. 156/285 |

* cited by examiner

SYSTEMS AND METHODS FOR ASSEMBLING A SKIN OF A COMPOSITE STRUCTURE

FIELD

The present disclosure is directed generally to systems and methods for assembling a skin of a composite structure and more particularly to systems and methods that utilize a plurality of ply kits to form the skin of the composite structure on an outer surface of an inner mold line layup mandrel.

BACKGROUND

Historically, construction and/or assembly of a composite structure on an inner mold line (IML) layup mandrel, which also may be referred to herein as an inner mold line tool, a layup mandrel, and/or an IML tool, is a serial process that involves sequentially forming a plurality of support structures, such as stringers and/or spacers, on an outer surface of the layup mandrel, followed by locating a continuous, or at least substantially continuous, length of composite fibers around the outer surface of the layup mandrel to form a skin of the composite structure. This locating may be accomplished by wrapping the length of composite fibers around the outer surface of the layup mandrel, such as by rotating the layup mandrel with respect to a layup head that dispenses the length of composite fibers and/or by rotating the layup head relative to the layup mandrel.

Generally, the support structures are formed from a plurality of plies, or layers, of a composite material, such as a pre-preg material, and each layer of the plurality of layers may be applied individually and/or sequentially to the outer surface of the layup mandrel. Similarly, the skin typically includes a plurality of layers, with each layer of the plurality of layers being applied individually and/or sequentially to the outer surface of the layup mandrel.

As composite structures become larger and more complex, such as may be the case for composite barrel assemblies for an airplane fuselage, the time required to perform the above-described serial processes becomes significant. In addition, a cost of layup mandrels for large and/or complex composite structures is substantial. Thus, there exists a need for improved systems and methods for assembling a skin of a composite structure.

SUMMARY

Systems and methods for assembling a skin of a composite structure on an outer surface of an inner mold line layup mandrel. The systems and methods include receiving a plurality of ply kits, assembling the plurality of ply kits to form a skin segment that defines a portion of the skin, and affixing the skin segment to the outer surface of the layup mandrel. The assembling includes transferring a respective ply kit of the plurality of ply kits to a non-planar transfer tool, compacting the respective ply kit on the non-planar transfer tool, and repeating the transferring and the compacting for each ply kit in the plurality of ply kits to form the skin segment.

In some embodiments, each of the plurality of ply kits may include a plurality of stacked plies. In some embodiments, the assembling further may include locating the respective ply kit on a planar indexing surface prior to the transferring. In some embodiments, the respective ply kit may include a respective ply carrier sheet, the locating may include locating the respective ply carrier sheet between the plurality of plies and the planar indexing surface, and the transferring may include flipping the respective ply kit such that the plurality of plies is located between the respective ply carrier sheet and the non-planar transfer tool.

In some embodiments, the receiving may include simultaneously receiving at least two of the plurality of ply kits. In some embodiments, the receiving may include forming the plurality of ply kits. In some embodiments, the forming may include forming the plurality of ply kits on a planar layup bed and/or concurrently forming at least two of the plurality of ply kits. In some embodiments, the forming may include maintaining a thickness and/or number of plies in each ply kit of the plurality of ply kits below a threshold thickness and/or number of plies below which each ply kit will not buckle when bent to a radius of curvature that is less than a threshold buckling radius of curvature.

In some embodiments, the transferring may include bending the respective ply kit to a transfer radius of curvature that is greater than the threshold buckling radius of curvature. In some embodiments, the transfer radius of curvature is less than a radius of curvature of an upper surface of the non-planar transfer tool.

In some embodiments, the affixing may include compressing the skin segment against the outer surface of the layup mandrel. In some embodiments, the compressing may include pressurizing a plurality of compaction bladders. In some embodiments, the pressurizing may include sequentially pressurizing the plurality of compaction bladders by pressurizing a central compaction bladder prior to pressurizing two or more outer compaction bladders.

In some embodiments, the method may be repeated a plurality of times to affix a plurality of skin segments to the outer surface of the layup mandrel. In some embodiments, the repeating includes creating a plurality of interfaces between adjacent pairs of skin segments. In some embodiments, the systems and methods further include forming a plurality of stringers. In some embodiments, at least a portion of the plurality of stringers is formed at least partially concurrently with at least a portion of the plurality of ply kits. In some embodiments, the systems and methods further include affixing the plurality of stringers to the outer surface of the layup mandrel. In some embodiments, the composite structure forms a portion of an aircraft.

DESCRIPTION

Figure 1:
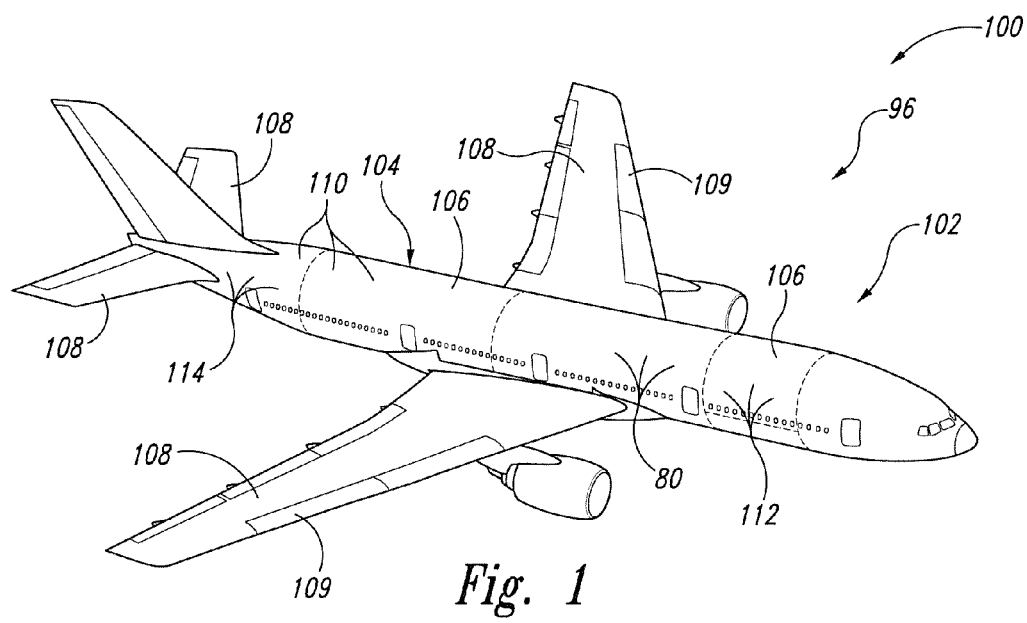
FIG. 1 is an illustrative, non-exclusive example of an aircraft that includes a composite structure that may be formed using the systems and methods according to the present disclosure.

FIGS. 1-14 provide illustrative, non-exclusive examples of composite structures 96, composite structure fabrication assemblies 20, and/or components thereof according to the present disclosure. Elements that serve a similar, or at least substantially similar, purpose are labeled with like numbers in each of FIGS. 1-14, and these elements may not be discussed in detail herein with reference to each of FIGS. 1-14. Similarly, all elements may not be labeled in each of FIGS. 1-14, but reference numerals associated therewith may still be utilized herein for consistency. In general, elements that are likely to be included in a given embodiment are shown in solid lines, while elements that are optional to a given embodiment are shown in dashed lines. However, elements that are shown in solid lines are not essential to all embodiments, and an element shown in solid lines may be omitted from a particular embodiment without departing from the scope of the present disclosure.

Figure 2:
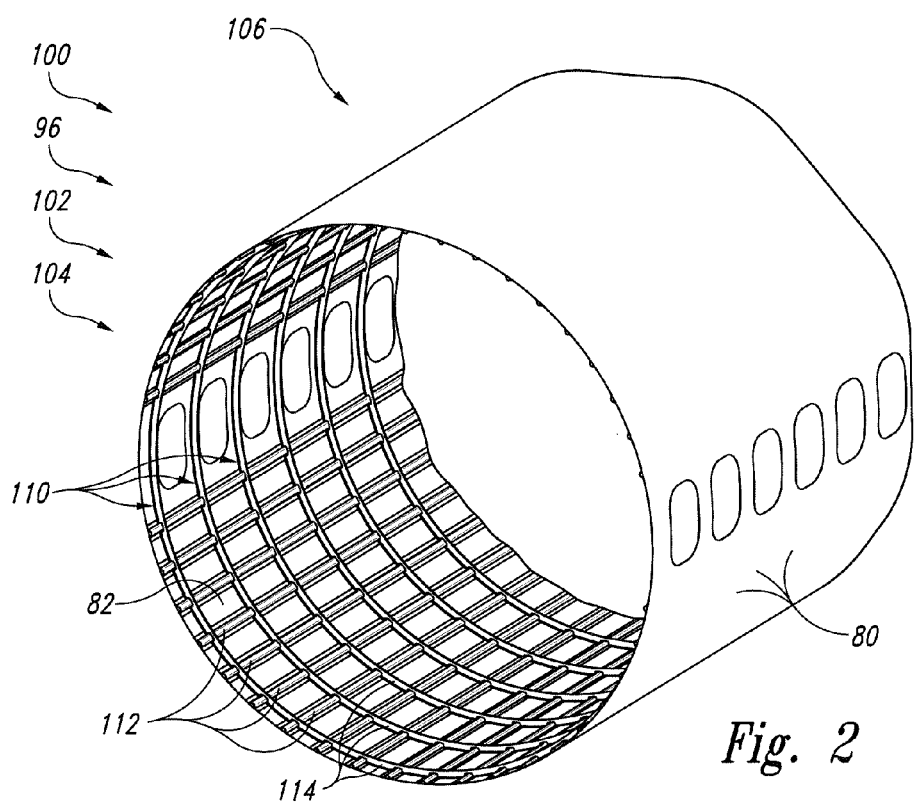
FIG. 2 is an illustrative, non-exclusive example of a fuselage barrel that includes a composite structure that may be formed using the systems and methods according to the present disclosure.

FIG. 1 is an illustrative, non-exclusive example of an aircraft 100 that includes a composite structure 96 that may be formed using the systems and methods according to the present disclosure, and FIG. 2 is an illustrative, non-exclusive example of a fuselage barrel 106 that may form a portion of aircraft 100 and includes composite structure 96. Aircraft 100 and/or composite structure 96 thereof may include a plurality of skin segments 80, which also may be referred to herein as a plurality of gores, that may form, cover, and/or be an outer surface of any suitable portion of the aircraft. As illustrated most clearly in FIG. 2, aircraft 100 also may include a plurality of stringers 112 that, together with a plurality of frames 114, may support an inner surface 82 of skin segments 80. A plurality of fillers 110 may extend between frames 114 and inner surface 82 and may form a portion of the composite structure.

It is within the scope of the present disclosure that any suitable portion of aircraft 100 may be formed from and/or be composite structure 96. As illustrative, non-exclusive examples, composite structure 96 may form, or form a portion of, an airframe 102, a fuselage 104, a fuselage barrel 106, a wing 108, and/or a stabilizer 109 of aircraft 100.

Figure 3:
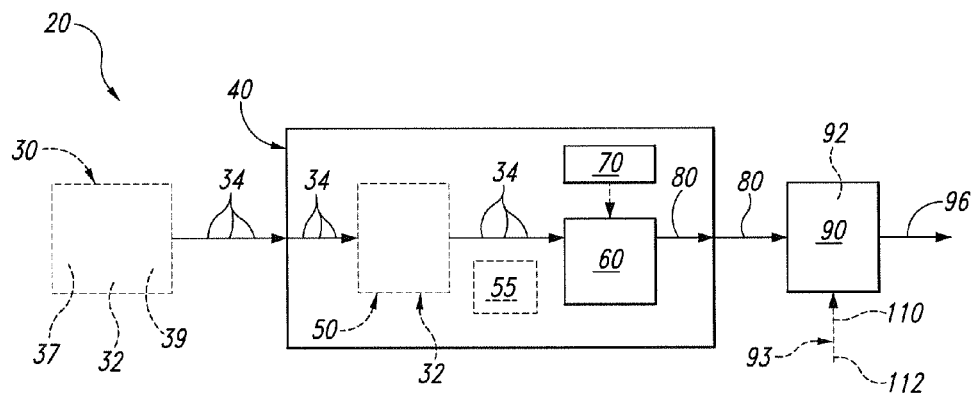
FIG. 3 is schematic representation of illustrative, non-exclusive examples of a composite structure fabrication assembly according to the present disclosure.

FIG. 3 is schematic representation of illustrative, non-exclusive examples of a composite structure fabrication assembly 20 according to the present disclosure that is configured to fabricate composite structure 96. FIGS. 4-11 provide less schematic but still illustrative, non-exclusive examples of components of composite structure fabrication assembly 20 and/or process steps that may be performed during the assembly of composite structure 96.

As illustrated in FIG. 3, composite structure fabrication assembly 20 may include a ply kit supply system 30 that is configured to provide a plurality of ply kits 34 to a skin segment assembly system 40. Skin segment assembly system 40 may include a planar indexing surface 50, a conveyance tool 55, a non-planar transfer tool 60, and a compaction tool 70 and is configured to receive the plurality of ply kits 34 and to produce a skin segment 80 therefrom. Skin segment 80 may be affixed to a layup mandrel 90. This process may be repeated any suitable number of times to affix any suitable number of skin segments 80 to layup mandrel 90, thereby producing composite structure 96 therefrom. In addition, one or more additional structures 93, such as one or more fillers 110 and/or stringers 112, also may be affixed to layup mandrel 90, be operatively attached to skin segments 80, and/or form a portion of composite structure 96.

Ply kit supply system 30 may include any suitable structure that is configured to form one or more ply kits 34, store one or more ply kits 34, and/or provide one or more ply kits 34 to skin segment assembly system 40. As an illustrative, non-exclusive example, ply kit supply system 30 may include a ply kit storage structure 37 that is configured to store the plurality of ply kits 34. As another illustrative, non-exclusive example, ply kit supply system 30 may include a ply kit conveyance structure 39 that is configured to convey the plurality of ply kits 34 to skin segment assembly system 40.

Figure 4:
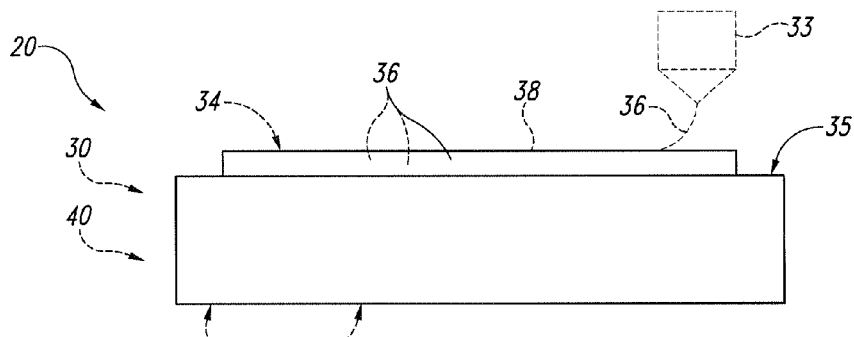
FIG. 4 is a schematic representation of illustrative, non-exclusive examples of a ply kit supply system and/or a planar indexing surface that may form a portion of a skin segment assembly system according to the present disclosure.

As yet another illustrative, non-exclusive example, and as illustrated in more detail in FIG. 4, ply kit supply system 30 may include a planar layup bed 32 that is configured to receive one or more plies 36 that form ply kit 34. As another illustrative, non-exclusive example, ply kit supply system 30 further may include a layup head 33 that is configured to locate each ply 36 within ply kit 34 upon planar layup bed 32. As illustrated in FIG. 4, planar layup bed 32 includes a planar, or at least substantially planar, upper surface 35, and the plurality of plies 36 may be at least substantially planar when located thereon.

In addition to one or more plies 36, and as illustrated in dashed lines in FIG. 4, ply kit 34 also may include a ply carrier sheet 38. Ply carrier sheet 38 may be configured to retain the one or more plies 36 that are associated with ply kit 34 thereon, to provide a protective covering for ply kit 34, to permit transfer of ply kit 34 among the various components of composite structure fabrication assembly 20, and/or to maintain and/or retain a relative orientation of a first ply 36 that is included within ply kit 34 relative to a second ply 36 that is included within ply kit 34.

It is within the scope of the present disclosure that ply kit 34 may include any suitable number of plies 36, including at least 1, at least 2, at least 3, at least 4, at least 6, at least 8, at least 10, at least 12, at least 15, at least 20, or at least 25 plies. When ply kit 34 includes a plurality of plies 36, it is within the scope of the present disclosure that the plurality of plies 36 may be arranged with any suitable relative orientation. As illustrative, non-exclusive examples, the plurality of plies 36 may include a plurality of stacked plies 36 that are arranged in a plurality of parallel, or at least substantially parallel, planes. As another illustrative, non-exclusive example, a first ply 36 of the plurality of plies 36 may be coplanar with, or located beside, a second ply 36 of the plurality of plies 36. As yet another illustrative, non-exclusive example, each ply 36 of the plurality of plies may include a plurality of fibers that are oriented along a ply axis, and a first ply axis of a first ply 36 of the plurality of plies 36 may be parallel to or oriented at an angle relative to a second ply axis of a second ply 36 of the plurality of plies 36.

In addition, and when ply kit 34 includes a plurality of plies 36 the number of plies in the plurality of plies 36 may be maintained below a threshold number of plies 36 below which the ply kit 34 will not warp, distort, kink, crumple, and/or buckle when bowed, curved, deformed, and/or bent to a radius of curvature that is greater than a threshold buckling radius of curvature. Additionally or alternatively, an overall thickness of the ply kit 34 may be maintained below a threshold thickness below which the ply kit 34 will not buckle when bent to a radius of curvature that is greater than the threshold buckling radius of curvature. This may permit transferring of the ply kit 34 from planar indexing surface 50 to non-planar transfer tool 60, as discussed in more detail herein, without inducing, generating, and/or producing buckling within the individual plies 36 that are present within the ply kit 34.

It is within the scope of the present disclosure that the threshold buckling radius of curvature may include an/or be any suitable radius of curvature and that it may be controlled, dictated, and/or a result of any suitable property of ply kit 34, such as a thickness and/or stiffness of plies 36 of the ply kit 34, the overall thickness of ply kit 34, the number of plies 36 within ply kit 34, and/or an inter-ply adhesion among plies 36 of ply kit 34. Illustrative, non-exclusive examples of threshold buckling radii of curvature according to the present disclosure include radii of curvature of greater than 0.25 meters (m), greater than 0.5 m, greater than 0.75 m, greater than 1 m, greater than 1.25 m, greater than 1.5 m, greater than 1.75 m, greater than 2 m, greater than 2.25 m, greater than 2.5 m, greater than 2.75 m, or greater than 3 m. Additional illustrative, non-exclusive examples of threshold buckling radii of curvature according to the present disclosure include radii of curvature of less than 4 m, less than 3.75 m, less than 3.5 m, less than 3.25 m, less than 3 m, less than 2.75 m, less than 2.5 m, less than 2.25 m, less than 2 m, less than 1.75 m, less than 1.5 m, less than 1.25 m, or less than 1 m.

Skin segment assembly system 40 may include any suitable structure that is configured to receive the plurality of ply kits 34, to produce skin segment 80 therefrom, and/or to attach skin segment 80 to layup mandrel 90. This may include any suitable structure, illustrative, non-exclusive examples of which are discussed in more detail herein, that may assemble the plurality of ply kits 34 to form the skin segment 80, may convey the plurality of skin segments 80 within the skin segment assembly system 40, and/or may convey skin segment 80 to layup mandrel 90.

As illustrated in FIG. 3, skin segment assembly system 40 may include planar indexing surface 50. FIG. 4 provides a less schematic but still illustrative, non-exclusive example of planar indexing surface 50. As illustrated in FIG. 4, planar indexing surface 50 also may be and/or may be referred to herein as planar layup bed 32 and may form a portion of ply kit supply system 30. Thus, it is within the scope of the present disclosure that ply kit 34 may be formed within skin segment assembly system 40 and/or formed on planar indexing surface 50. Regardless, planar indexing surface 50 includes planar upper surface 35 that is configured to support ply kit 34 thereon, and it is within the scope of the present disclosure that ply kit 34 may be arranged, oriented, and/or otherwise inspected while located upon upper surface 35 of planar indexing surface 50, as discussed in more detail herein.

Figure 5:
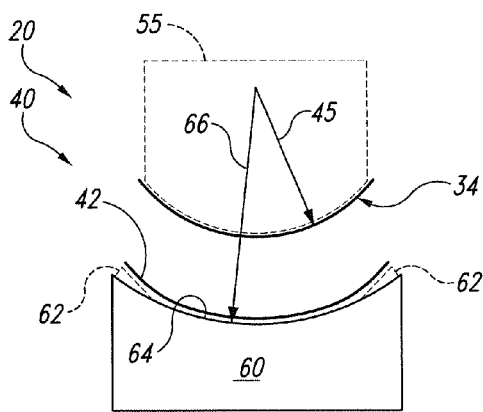
FIG. 5 is a schematic representation of illustrative, non-exclusive examples of a ply kit that has been bent to a transfer radius of curvature according to the present disclosure and is being transferred to a non-planar transfer tool according to the present disclosure.

Subsequent to location and/or formation of ply kit 34 on planar indexing surface 50, ply kit 34 may be transferred from planar indexing surface 50 to non-planar transfer tool 60, such as through the use of conveyance tool 55. As illustrated in FIG. 5 and discussed in more detail herein with reference to methods 200 of FIG. 15, this transferring may include bending ply kit 34 to a transfer radius of curvature 45 that is greater than the threshold buckling radius of curvature but less than a transfer tool radius of curvature 66 of a non-planar upper surface 64 of non-planar transfer tool 60 prior to placing and/or otherwise locating ply kit 34 upon non-planar transfer tool 60.

As illustrated in FIGS. 5-9 and 11, non-planar transfer tool 60 may include non-planar upper surface 64 that defines and/or a shape of which may be approximated by transfer tool radius of curvature 66, which also may be referred to herein as a radius of curvature 66 of upper surface 64 of non-planar transfer tool 60. Illustrative, non-exclusive examples of transfer tool radius of curvature 66 according to the present disclosure include radii of curvature of greater than 0.5 m, greater than 0.75 m, greater than 1 m, greater than 1.25 m, greater than 1.5 m, greater than 1.75 m, greater than 2 m, greater than 2.25 m, greater than 2.5 m, greater than 2.75 m, greater than 3 m, or greater than 3.25 m and/or radii of curvature of less than 4.5 m, less than 4 m, less than 3.75 m, less than 3.5 m, less than 3 m, less than 2.75 m, less than 2.5 m, less than 2.25 m, less than 2 m, less than 1.75 m, or less than 1.5 m.

Figure 6:
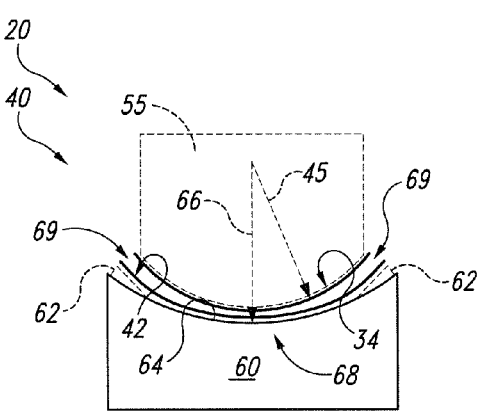
FIG. 6 is a schematic representation of illustrative, non-exclusive examples of a non-planar transfer tool according to the present disclosure that has a single ply kit located thereon.

As illustrated in FIG. 6, the difference between transfer radius of curvature 45 and transfer tool radius of curvature 66 may permit contact between ply kit 34 and upper surface 64 to occur in a central region 68 of upper surface 64 prior to contact in an edge region 69 of upper surface 64. This may permit efficient transfer of ply kit 34 to upper surface 64 of non-planar transfer tool 60, permit transfer of ply kit 34 to non-planar transfer tool 60 without buckling and/or wrinkling ply kit 34, permit transfer of a plurality of ply kits 34 to non-planar transfer tool 60 without wrinkling thereof, and/or permit accurate alignment of a plurality of ply kits 34 upon upper surface 64 of non-planar transfer tool 60, such as by alignment of central regions 68 thereof.

Figure 7:
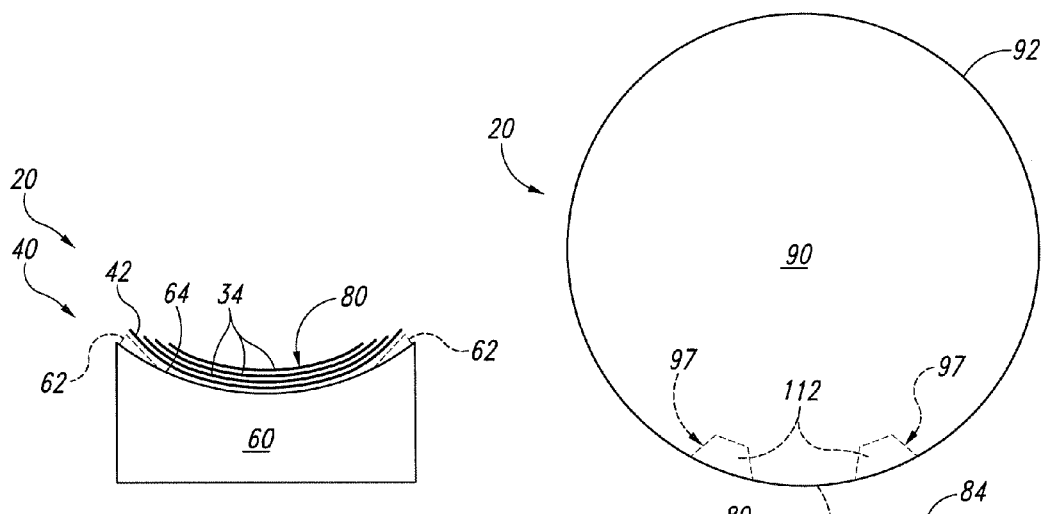
FIG. 7 is a schematic representation of illustrative, non-exclusive examples of a non-planar transfer tool according to the present disclosure that has a plurality of ply kits located thereon.

As also illustrated in FIGS. 5-7, one or more shims 62 may form a portion of non-planar transfer tool 60, thereby forming and/or controlling the shape of upper surface 64 thereof. In addition, a skin segment carrier sheet 42 may separate ply kit 34 from upper surface 64 and/or protect a lower surface of ply kit 34 from damage thereto. It is within the scope of the present disclosure that upper surface 64 may include and/or define any suitable shape, illustrative, non-exclusive examples of which include a non-planar shape, a concave shape, a contoured shape, and/or a shape that defines at least one curve. Additionally or alternatively, the shape of upper surface 64 may match, mirror, correspond to, and/or be complementary to a shape of an outer surface 92 of layup mandrel 90 (as illustrated in FIGS. 8-12).

As illustrated in FIG. 7, a plurality of ply kits 34 may be assembled upon upper surface 64 of non-planar transfer tool 60 to produce skin segment 80. As discussed in more detail herein with reference to methods 200 of FIG. 15, compaction tool 70 of FIG. 1 may be utilized to compact one or more ply kits 34 on non-planar transfer tool 60, thereby increasing an adhesion therebetween and/or increasing a conformance of a shape of ply kits 34 to a shape of upper surface 64 of non-planar transfer tool 60.

Compaction tool 70 may include any suitable structure that is configured to compact and/or compress one or more ply kits 34 on non-planar transfer tool 60, increase adhesion between two or more ply kits 34, remove air from between two or more ply kits 34, and/or remove a void space from between two or more ply kits 34. As an illustrative, non-exclusive example, compaction tool 70 may apply a force to an upper surface of ply kits 34, thereby compressing ply kits 34 between the compaction tool and the non-planar transfer tool. As another illustrative, non-exclusive example, compaction tool 70 may include and/or be a vacuum compaction tool that is configured to create a vacuum around ply kits 34. The vacuum compaction tool may remove air from between ply kits 34 and/or may utilize atmospheric pressure to apply the force to the upper surface of ply kits 34 and thereby compress the ply kits.

Subsequent to formation of skin segment 80 on upper surface 64 of non-planar transfer tool 60, skin segment 80 may be affixed to outer surface 92 of layup mandrel 90, as illustrated in FIGS. 8-11. Layup mandrel 90 and/or outer surface 92 thereof may define any suitable shape. As illustrative, non-exclusive examples, outer surface 92 of layup mandrel 90 may define a contour of an inner surface of an aircraft, a portion of an aircraft, an airframe, a portion of an airframe, a fuselage, a portion of a fuselage, a fuselage barrel, a portion of a fuselage barrel, a wing, a portion of a wing, a stabilizer, and/or a portion of a stabilizer.

Figure 8:
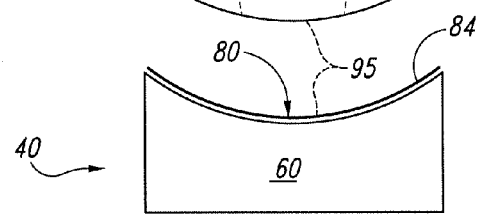
FIG. 8 is a schematic representation of illustrative, non-exclusive examples of a non-planar transfer tool that is positioned to affix a skin segment to a layup mandrel.

As illustrated in FIG. 8, and prior to affixing skin segment 80 on outer surface 92, one or more stringers 112, which also may be referred to herein as stiffeners 112, may be affixed within one or more channels 97 that may be defined within layup mandrel 90. In addition, and also prior to affixing skin segment 80 to outer surface 92, an adhesive 95, which also may be referred to herein as an adhesive strip 95, may be attached to outer surface 92 and/or to an upper surface 84 of skin segment 80. Adhesive 95 may be configured to temporarily attach skin segment 80 to outer surface 92, such as until completion of the composite structure 96.

Figure 9:
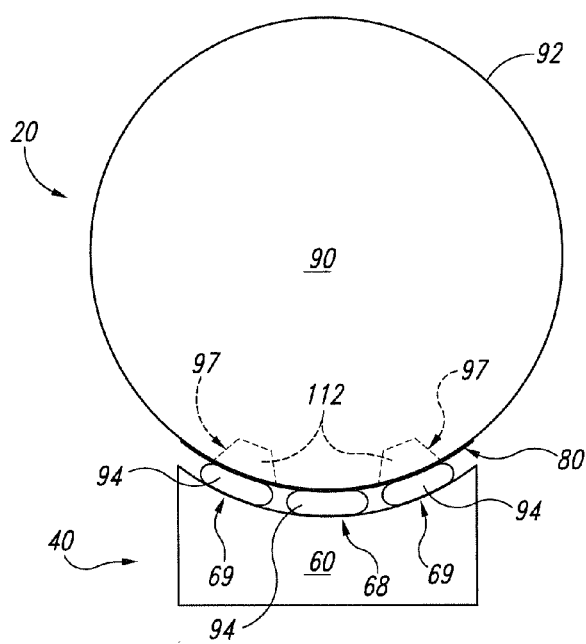
FIG. 9 is a schematic representation of illustrative, non-exclusive examples of a non-planar transfer tool affixing a skin segment to a layup mandrel.

As also illustrated in FIG. 8, affixing skin segment 80 to outer surface 92 may include aligning non-planar transfer tool 60 vertically below layup mandrel 90, such as by moving the non-planar transfer tool and/or moving the layup mandrel 90. Subsequently, and as illustrated in FIG. 9, skin segment 80 may be brought into contact with layup mandrel 90. This may include moving non-planar transfer tool 60 toward layup mandrel 90 and/or moving layup mandrel 90 toward non-planar transfer tool 60. In addition, and as also illustrated in FIG. 9, a plurality of compaction bladders 94, which also may be referred to herein as air bladders 94, may be inflated to compress, squeeze, and/or otherwise compact skin segment 80 against outer surface 92, thereby affixing skin segment 80 to outer surface 92.

Figure 15:
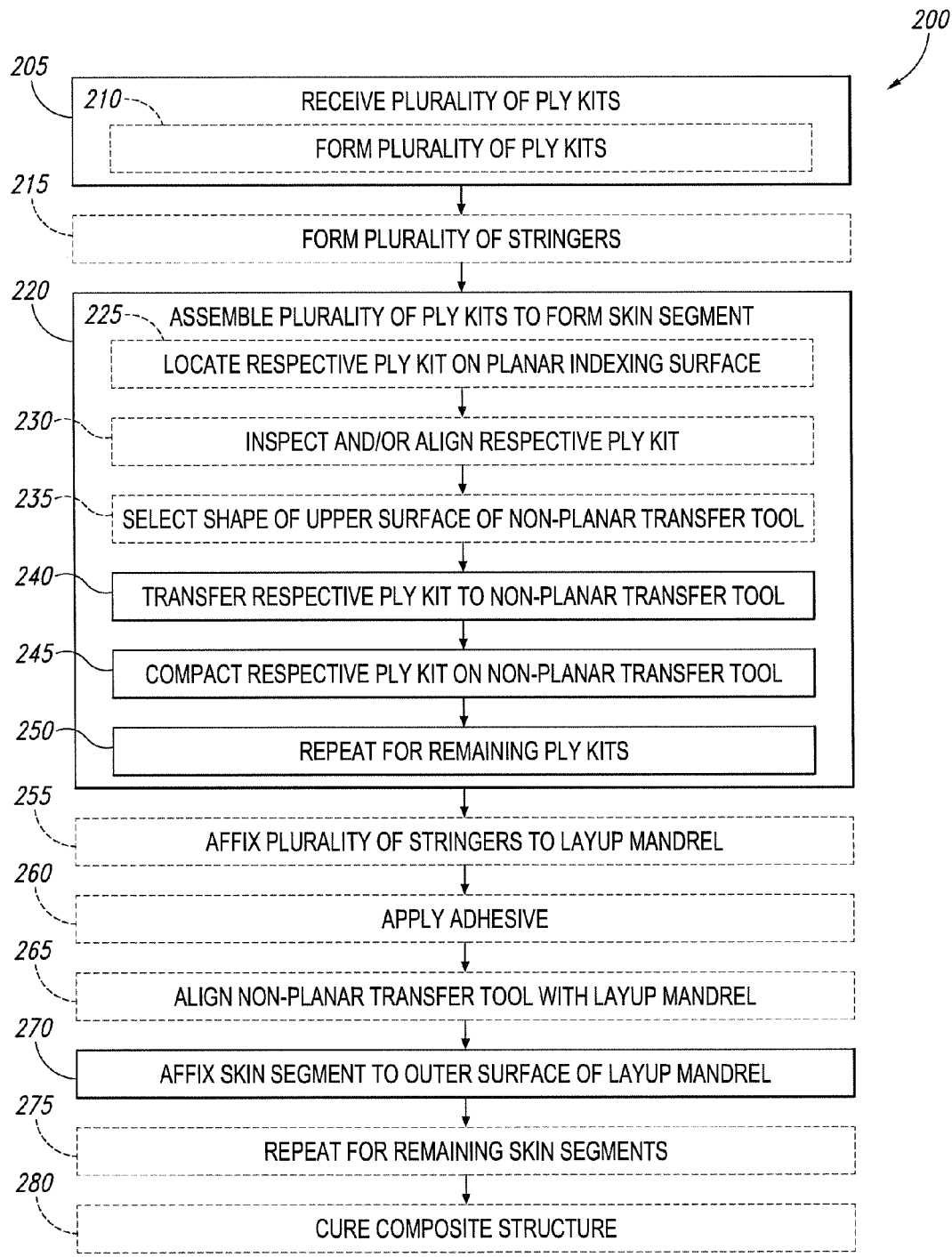
FIG. 15 is a flowchart depicting methods according to the present disclosure of assembling a skin of a composite structure.

It is within the scope of the present disclosure that, as discussed in more detail herein with reference to methods 200 of FIG. 15, compaction bladders 94 may be inflated in a pre-defined and/or selective order when affixing skin segment 80 to outer surface 92. As an illustrative, non-exclusive example, this may include inflating one or more compaction bladders 94 that are proximal to central region 68 of non-planar transfer tool 60 prior to inflating one or more compaction bladders 94 that are proximal to edge region 69, thereby decreasing a potential for trapping air between skin segment 80 and outer surface 92 and/or decreasing a potential for buckling of skin segment 80.

Figure 10:
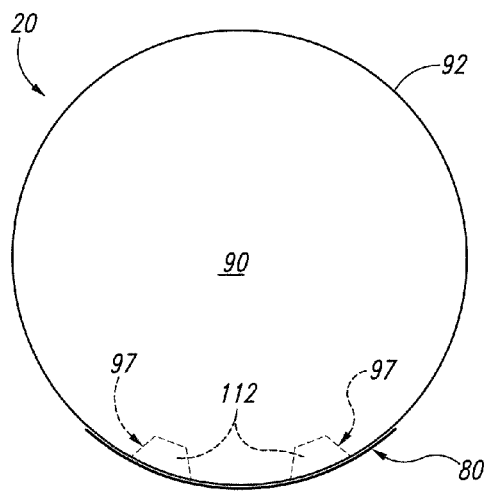
FIG. 10 is a schematic representation of illustrative, non-exclusive examples of a layup mandrel with a skin segment attached thereto.
Figure 11:
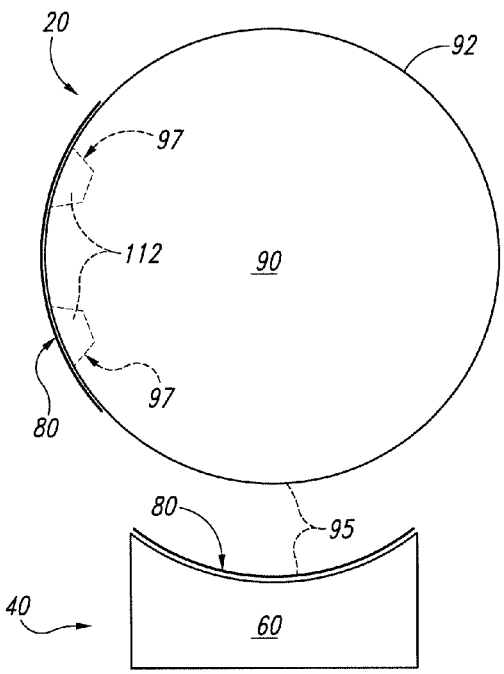
FIG. 11 is a schematic representation of illustrative, non-exclusive examples of a non-planar transfer tool that is located to affix a subsequent skin segment to a layup mandrel.

As illustrated in FIG. 10, and subsequent to affixing skin segment 80 to outer surface 92, non-planar transfer tool 60 may be separated from skin segment 80, thereby leaving skin segment 80 attached to layup mandrel 90. This process may be repeated any suitable number of times to assemble any suitable number of skin segments 80 and affix the assembled skin segments 80 to layup mandrel 90, thereby creating, forming, and/or fabricating composite structure 96. This may include assembly and/or formation of a second skin segment 80 on non-planar transfer tool 60, rotation of layup mandrel 90, and alignment of the second skin segment on non-planar transfer tool 60 vertically below a region, portion, and/or section of outer surface 92 of layup mandrel 90 that does not include a skin segment attached thereto, as illustrated in FIG. 11.

Figure 12:
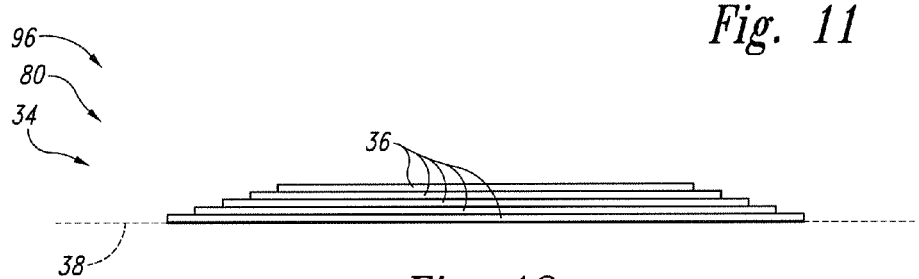
FIG. 12 is a schematic cross-sectional view of illustrative, non-exclusive examples of a ply kit according to the present disclosure.
Figure 13:
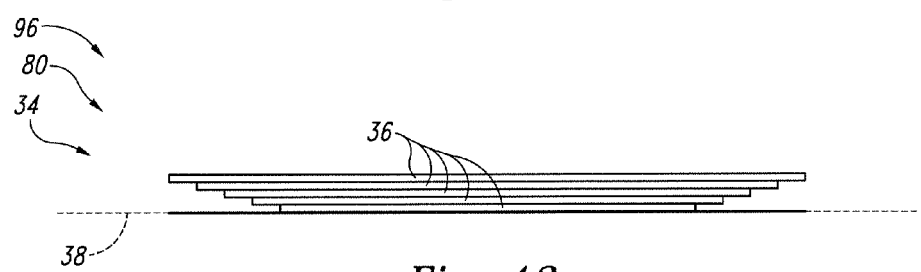
FIG. 13 is another schematic cross-sectional view of illustrative, non-exclusive examples of a ply kit according to the present disclosure.

As discussed, ply kits 34 may include one or more plies 36 and also may include a ply carrier sheet 38. FIGS. 12-13 provide schematic cross-sectional views of illustrative, non-exclusive examples of ply kits 34 according to the present disclosure. In FIGS. 12 and 13, ply kits 34 may be constructed by sequentially combining the plurality of plies 36, one on top of the other, to produce the plurality of stacked plies 36 that is illustrated therein, such as by using planar layup bed 32 and layup head 33 of ply kit supply system 30 that is illustrated in FIG. 4.

In ply kit 34 of FIG. 12, each respective ply 36 is smaller than a previous ply 36 upon which the respective ply 36 is located (or is smaller than the plies 36 that are present between the respective ply 36 and ply carrier sheet 38). In contrast, in ply kit 34 of FIG. 13, each respective ply 36 is larger than a previous ply 36 upon which the respective ply 36 is located (or is larger than the plies 36 that are present between the respective ply 36 and ply carrier sheet 38). Skin segment 80 may include a similar structure, with ply kits 34 that are combined to form skin segment 80 being progressively larger, or smaller, as the thickness of the skin segment 80 (or the number of ply kits 34 that are included therein) is increased.

Plies 36 may include any suitable structure that may be utilized to form ply kits 34 and/or skin segments 80. As an illustrative, non-exclusive example, and as discussed in more detail herein, plies 36 may include the plurality of fibers, such as a plurality of carbon, polymeric, and/or glass fibers. As another illustrative, non-exclusive example, plies 36 may include a resin material, such as an epoxy, an adhesive, and/or a polymeric resin. As yet another illustrative, non-exclusive example, plies 36 may include a pre-impregnated, or pre-preg, material that includes the plurality of fibers and the resin material.

Figure 14:
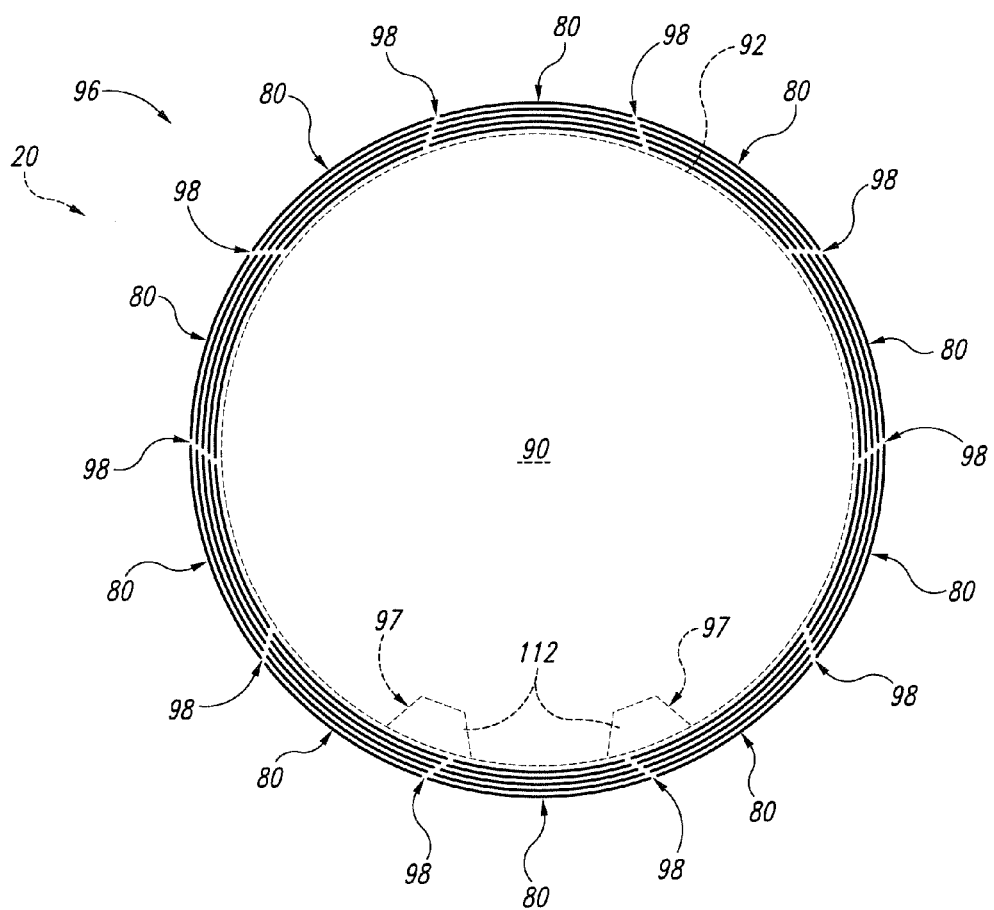
FIG. 14 is a schematic representation of illustrative, non-exclusive examples of a composite structure according to the present disclosure.

FIG. 14 is a schematic representation of illustrative, non-exclusive examples of composite structures 96 according to the present disclosure. As illustrated in FIG. 14, the systematic variation in the size of plies 36 with vertical location within ply kit 34 and/or the systematic variation in the size of ply kits 34 with vertical location within skin segment 80 may permit formation of overlapping interfaces 98 within composite structure 96. These overlapping interfaces, which also may be referred to herein as interfaces 98, overlapping joints 98, joints 98, scarf joints 98, and/or splice joints 98, provide a surface area for adhesion between adjacent pairs of skin segments 80 that comprise composite structure 96.

Layup mandrel 90 is illustrated in dashed lines in FIG. 14, indicating that the layup mandrel may be separated from the composite structure subsequent to formation thereof. This may include removing layup mandrel 90 subsequent to attaching a desired number of skin segments 80, removing layup mandrel 90 subsequent to formation of a completed composite structure 96, and/or removing layup mandrel 90 subsequent to curing of composite structure 96.

FIG. 15 is a flowchart depicting methods 200 according to the present disclosure of assembling a skin of a composite structure. In FIG. 15, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 15 are not limiting and other methods and steps are within the scope of the present disclosure, including methods having greater than or fewer than the illustrated number of steps, as understood from the discussions herein.

Methods 200 include receiving a plurality of ply kits at 205 and may include forming a plurality of stringers at 215. Methods 200 further include assembling the plurality of ply kits to form a skin segment at 220 and may include affixing the plurality of stringers to a layup mandrel at 255, applying an adhesive to the layup mandrel at 260, and/or aligning a non-planar transfer tool with the layup mandrel at 265. Methods 200 further include affixing the skin segment to an outer surface of the layup mandrel at 270 and may include repeating the method to assemble one or more additional skin segments and attach the additional skin segments to the outer surface of the layup mandrel at 275 and/or curing the composite structure at 280.

Receiving the plurality of ply kits at 205 may include receiving the plurality of ply kits from any suitable source, such as a ply kit supply system, illustrative, non-exclusive examples of which are discussed in more detail herein. As discussed in more detail herein, each ply kit may be associated with and/or operatively attached to a respective ply carrier sheet, and the receiving may include receiving the respective ply carrier sheet with the ply kit. It is within the scope of the present disclosure that the receiving may include simultaneously receiving at least two ply kits of the plurality of ply kits.

Additionally or alternatively, and as also discussed in more detail herein, the receiving further may include forming the plurality of ply kits at 210. This may include constructing each ply kit of the plurality of ply kits on a respective ply carrier sheet, operatively attaching one or more plies to the respective ply carrier sheet, and/or layering the plurality of plies on top of one another to form a plurality of stacked plies that comprises the ply kit.

As also discussed in more detail herein, the forming at 210 may include forming the plurality of ply kits on a planar layup bed and/or a planar indexing surface prior to transferring the plurality of plies to the non-planar transfer tool at 240. At least a portion of the plurality of ply kits may be formed separately from, independently from, and/or prior to the affixing at 270. Thus, it is within the scope of the present disclosure that the forming at 210 may include concurrently forming at least two ply kits of the plurality of ply kits and/or forming the at least two ply kits at least partially in parallel.

As discussed herein, the forming at 210 may include maintaining a thickness of each ply kit in the plurality of ply kits below a threshold thickness below which the ply kit will not buckle when bent to a radius of curvature that is greater than a threshold buckling radius of curvature. Additionally or alternatively, the forming at 210 also may include maintaining a number of plies within each ply kit of the plurality of ply kits below a threshold number of plies below which the ply kits will not buckle when bent to the radius of curvature that is greater than the threshold buckling radius of curvature. Illustrative, non-exclusive examples of threshold buckling radii of curvature are discussed in more detail herein.

Forming the plurality of stringers at 215 may include the use of any suitable systems and/or methods to form the plurality of stringers. As an illustrative, non-exclusive example, the plurality of stringers may be formed using the systems and methods that are disclosed in the U.S. patent application entitled "Systems and Methods for Assembling Stiffened Composite Structures," (Boeing Disclosure No. 12-0481-US-NP; Ser. No. 13/732,961) and/or the U.S. patent application entitled "Systems and Methods for Assembling Stiffened Composite Structures," (Boeing Disclosure No. 12-0971-US-NP; Ser. No. 13/733,036), which are co-owned with the instant application, and the complete disclosures of which are hereby incorporated by reference.

It is within the scope of the present disclosure that the forming at 215 may include forming at least a portion of the plurality of stringers at least partially concurrently with the receiving the plurality of ply kits at 205 and/or the forming the plurality of ply kits at 210. Thus, the systems and methods that are disclosed herein may permit parallel processing of the various components that are included within the composite structure, thereby decreasing a time needed to assemble the composite structure and/or a cost associated with assembly of the composite structure.

Assembling the plurality of ply kits to form the skin segment at 220 may include locating a respective ply kit of the plurality of ply kits on a planar indexing surface at 225, inspecting and/or aligning the respective ply kit on the planar indexing surface at 230, and/or selecting a shape of an upper surface of a non-planar transfer tool at 235. The assembling at 220 further includes transferring the respective ply kit to the non-planar transfer tool at 240, compacting the respective ply kit on the non-planar transfer tool at 245, and repeating at least the transferring at 240 and the compacting at 245 to sequentially layer each ply kit of the plurality of ply kits above a previous ply kit of the plurality of ply kits that are included in the skin segment, as indicated at 250.

Locating the respective ply kit on the planar indexing surface at 225 may include transferring, conveying, and/or otherwise moving the respective ply kit from any suitable ply kit supply and/or storage system to the planar indexing surface prior to the transferring at 240. This may include locating a respective ply carrier sheet that is associated with the respective ply kit between the plurality of plies that are contained therein and the planar indexing surface.

Additionally or alternatively, the locating may include and/or be the forming at 210. Thus, it is within the scope of the present disclosure that a completed ply kit may be located on the planar indexing surface; however, it is also within the scope of the present disclosure that at least a portion of the ply kit may be formed and/or completed subsequent to locating the ply kit on the planar indexing surface. Furthermore, and as discussed, the ply kit may be located and/or formed on a planar surface, such as the planar indexing surface, prior to being transferred to a non-planar surface, such as an upper surface of the non-planar transfer tool, during the transferring at 240.

Inspecting and/or aligning the respective ply kit at 230 may include inspecting and/or aligning the respective ply kit while the respective ply kit is located on the planar indexing surface. As an illustrative, non-exclusive example, the inspecting may include inspecting and/or verifying a size, thickness, and/or composition of the respective ply kit. As another illustrative, non-exclusive example, the inspecting may include inspecting and/or verifying a cleanliness of the respective ply kit and/or performing any other suitable quality control measure. As yet another illustrative, non-exclusive example, the aligning may include aligning the respective ply kit on the planar indexing surface, aligning the respective ply kit with a conveyance tool that is configured to perform the transferring at 240, and/or locating the respective ply kit on the conveyance tool.

Selecting the shape of the upper surface of the non-planar transfer tool at 235 may include selecting the shape of the upper surface of the non-planar transfer tool to match, mirror, and/or correspond to a shape of an outer surface of the layup mandrel, and may be performed prior to the transferring at 240. As an illustrative, non-exclusive example, the selecting at 235 may include placing one or more shims on the non-planar transfer tool to define at least a portion of the upper surface of the non-planar transfer tool. As another illustrative, non-exclusive example, the selecting at 235 may include selecting a specific non-planar transfer tool from a plurality of non-planar transfer tools. As yet another illustrative, non-exclusive example, the selecting at 235 may include modifying and/or changing the shape of the upper surface of the non-planar transfer tool, such as when the non-planar transfer tool includes a conformable upper surface. It is within the scope of the present disclosure that the upper surface of the non-planar transfer tool may include and/or define any suitable shape, illustrative, non-exclusive examples of which are discussed in more detail herein.

Transferring the respective ply kit to the non-planar transfer tool at 240 may include locating, aligning, placing, and/or otherwise positioning the respective ply kit on the upper surface of the non-planar transfer tool. This may include flipping the respective ply kit such that the respective plurality of plies that are included therein are located between a respective ply carrier sheet of the respective ply kit and the upper surface of the non-planar transfer tool.

It is within the scope of the present disclosure that the transferring at 240 also may include at least partially conforming a shape of the respective ply kit to the shape of the upper surface of the non-planar transfer tool. This may include conforming each ply of the plurality of plies to the shape of the upper surface of the non-planar transfer tool and/or permitting at least two adjacent plies of the plurality of plies to slide relative to one another during the conforming.

It is within the scope of the present disclosure that, prior to transferring a first ply kit of the plurality of ply kits to the non-planar transfer tool at 240, methods 200 further may include placing a skin segment carrier sheet on the upper surface of the non-planar transfer tool and/or locating the skin segment carrier sheet such that it separates the first ply kit from the upper surface of the non-planar transfer tool. As discussed in more detail herein, the transferring at 240 further may include bending the respective ply kit to a transfer radius of curvature that is less than a radius of curvature of the upper surface of the non-planar transfer tool and/or bending the respective ply kit to a transfer radius of curvature that is greater than a threshold buckling radius of curvature for the respective ply kit. Illustrative, non-exclusive examples of the threshold buckling radii of curvature are discussed in more detail herein.

Compacting the respective ply kit on the non-planar transfer tool at 245 may include the use of any suitable method and/or structure, such as a compaction tool, to compact the respective ply kit on the non-planar transfer tool. It is within the scope of the present disclosure that the compacting at 245 may include further conforming the shape of the respective ply kit to the shape of the upper surface of the non-planar transfer tool, increasing an adhesion between adjacent ply kits of the plurality of ply kits that comprise the skin segment, removing air from between the adjacent ply kits, removing void space from between the adjacent ply kits, and/or decreasing a thickness of the respective ply kit.

The compacting may be accomplished in any suitable manner, illustrative, non-exclusive examples of which are discussed in more detail herein, and may include vacuum compacting the respective ply kit. When the compacting includes vacuum compacting the respective ply kit, it is within the scope of the present disclosure that the vacuum compacting may include bagging the respective ply kit, such as by fluidly isolating the respective ply kit from ambient air using a flexible bagging material, during the vacuum compacting. However, it is also within the scope of the present disclosure that the vacuum compacting may not include bagging the respective ply kit during the vacuum compacting.

The repeating at 250 may include repeating the transferring and the compacting for each ply kit in the plurality of ply kits, thereby sequentially layering each ply kit in the plurality of ply kits above a previous ply kit of the plurality of ply kits to form the skin segment. It is within the scope of the present disclosure that the repeating may include compacting each ply kit of the plurality of ply kits prior to transferring a subsequent ply kit of the plurality of ply kits to the non-planar transfer tool. However, it is also within the scope of the present disclosure that two or more ply kits of the plurality of ply kits may be transferred to the upper surface of the non-planar transfer tool and that the compacting may include simultaneously compacting the two or more ply kits. It is further within the scope of the present disclosure that the repeating at 250 may include removing a respective ply carrier sheet from a respective ply kit of the plurality of ply kits prior to transferring a subsequent ply kit of the plurality of ply kits to the non-planar transfer tool.

The repeating at 250 may include repeating any suitable number of times. As an illustrative, non-exclusive example, the repeating may include repeating at least 2, at least 3, at least 4, at least 5, at least 6, at least 7, at least 8, at least 9, at least 10, at least 12, at least 14, at least 16, at least 18, or at least 20 times to layer a corresponding number of ply kits on the upper surface of the non-planar transfer tool, thereby forming the skin segment. Additionally or alternatively, the repeating at 250 may include repeating such that the skin segment includes at least 20, at least 25, at least 30, at least 35, at least 40, at least 45, at least 50, at least 55, at least 60, at least 65, at least 70, at least 75, or at least 80 stacked plies.

Affixing the plurality of stringers to the layup mandrel at 255 may include the use of any suitable system and/or method to affix the plurality of stringers to the outer surface of the layup mandrel, including those disclosed in the previously listed U.S. patent applications, which have been incorporated by reference. It is within the scope of the present disclosure that at least a portion of the plurality of stringers may be affixed to the outer surface of the layup mandrel prior to the affixing the skin segment to the outer surface of the layup mandrel at 270. In addition, it is also within the scope of the present disclosure that the affixing at 255 may be performed at least partially concurrently with the receiving at 205, the forming at 215, and/or the assembling at 220.

Applying the adhesive at 260 may include applying any suitable adhesive to the outer surface of the layup mandrel and/or an upper surface of the skin segment. As an illustrative, non-exclusive example, the applying at 260 may include painting, coating, and/or brushing the adhesive. As another illustrative, non-exclusive example, the applying at 260 may include applying one or more adhesive strips. It is within the scope of the present disclosure that, subsequent to the affixing at 270, the method further may include retaining the skin segment on the outer surface of the layup mandrel and that the retaining may include retaining with the adhesive.

Aligning the non-planar transfer tool with the layup mandrel at 265 may include positioning the non-planar transfer tool relative to the layup mandrel. This may include locating and/or positioning the non-planar transfer tool vertically below the layup mandrel and/or locating and/or positioning the layup mandrel vertically above the non-planar transfer tool. Additionally or alternatively, the aligning at 265 further may include receiving one or more alignment pins into one or more alignment holes, such as to index an orientation of the non-planar transfer tool relative to the layup mandrel.

Affixing the skin segment to the outer surface of the layup mandrel at 270 may include contacting the skin segment with the layup mandrel and/or adhering the skin segment to the layup mandrel, such as with the adhesive that was applied at 260. It is within the scope of the present disclosure that the contacting may be accomplished in any suitable manner. As illustrative, non-exclusive examples, the contacting may include moving the non-planar transfer tool and the layup mandrel toward one another, moving the layup mandrel toward the non-planar transfer tool, such as by lowering the layup mandrel, and/or moving the non-planar transfer tool toward the layup mandrel, such as by raising the non-planar transfer tool.

It is within the scope of the present disclosure that the affixing at 270 further may include compressing the skin segment against the layup mandrel. As discussed herein, the compressing may include pressurizing a plurality of compaction bladders to press the skin segment against the outer surface of the layup mandrel. This may include controlling a compressive force that is applied by the plurality of compaction bladders by maintaining a pressure within each of the plurality of compaction bladders below a threshold upper compaction bladder pressure. Additionally or alternatively, the compressing may include vacuum compacting the skin segment to the outer surface of the layup mandrel.

When the compressing includes compressing with the plurality of compaction bladders, the pressurizing may include sequentially pressurizing the plurality of compaction bladders in a specific, or predefined, order. As an illustrative, non-exclusive example, and as discussed herein, the pressurizing may include pressurizing a central compaction bladder that is located between two or more outer compaction bladders prior to pressurizing the outer compaction bladders.

As discussed herein, the composite structure may include a plurality of skin segments. When the composite structure includes the plurality of skin segments, the repeating at 275 may include repeating at least the assembling at 220 and the affixing at 270 to attach at least one additional skin segment to the outer surface of the layup mandrel. As an illustrative, non-exclusive example, the layup mandrel may define a plurality of surface regions, and the repeating may include repeating to affix a respective skin segment to at least a portion, a majority, or all of the plurality of surface regions. As another illustrative, non-exclusive example, each skin segment of the plurality of skin segments may define a portion of an outer perimeter of the composite structure, such as less than 50%, less than 40%, less than 30%, less than 25%, less than 20%, less than 15%, or less than 10% of the outer perimeter of the composite structure, and the repeating at 275 may include forming the outer perimeter of the composite structure by affixing the plurality of skin segments to the layup mandrel. It is within the scope of the present disclosure that the plurality of skin segments may include any suitable number of skin segments, including at least 2, at least 3, at least 4, at least 5, at least 6, at least 8, or at least 10 skin segments.

As discussed herein, and when the composite structure includes the plurality of skin segments, the repeating at 275 further may include creating a plurality of interfaces between adjacent pairs of skin segments. Illustrative, non-exclusive examples of the interfaces that may be created between the adjacent pairs of skin segments are discussed in more detail herein. Additionally or alternatively, the repeating at 275 further may include simultaneously assembling a plurality of skin segments during the assembling at 220 and/or simultaneously affixing the plurality of skin segments to the layup mandrel during the affixing at 270.

Curing the composite structure at 280 may include heating and/or otherwise annealing the composite structure. This may include curing the composite structure while the composite structure is affixed to the outer surface of the layup mandrel or curing the composite structure subsequent to removal of the composite structure from the layup mandrel. Thus, it is within the scope of the present disclosure that methods 200 further may include removing the composite structure from the layup mandrel, and that the removing may be performed before or after the curing.

Curing the composite structure may include annealing the composite structure in an autoclave and/or an oven, curing the composite structure for any suitable curing time, and/or curing the composite structure at any suitable curing temperature. Illustrative, non-exclusive examples of curing times according to the present disclosure include curing times of at least 4 hours, at least 5 hours, at least 6 hours, at least 7 hours, at least 8 hours, at least 9 hours, or at least 10 hours. Illustrative, non-exclusive examples of curing temperatures according to the present disclosure include curing temperatures of at least 100° C., at least 125° C., at least 150° C., at least 175° C., at least 200° C., at least 225° C., at least 250° C., or at least 275° C.

Figure 16:
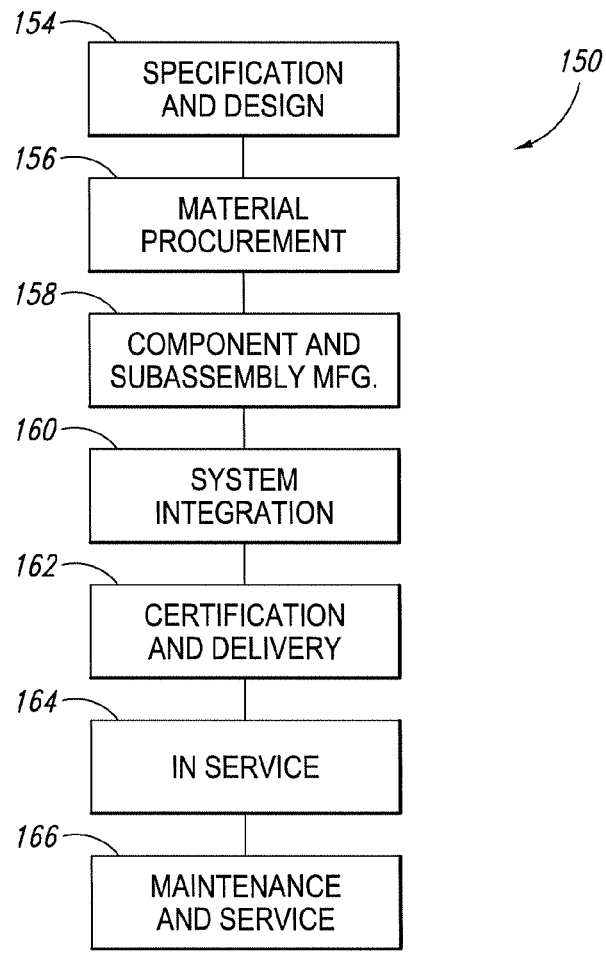
FIG. 16 is a flow diagram of aircraft production and service methodology.
Figure 17:
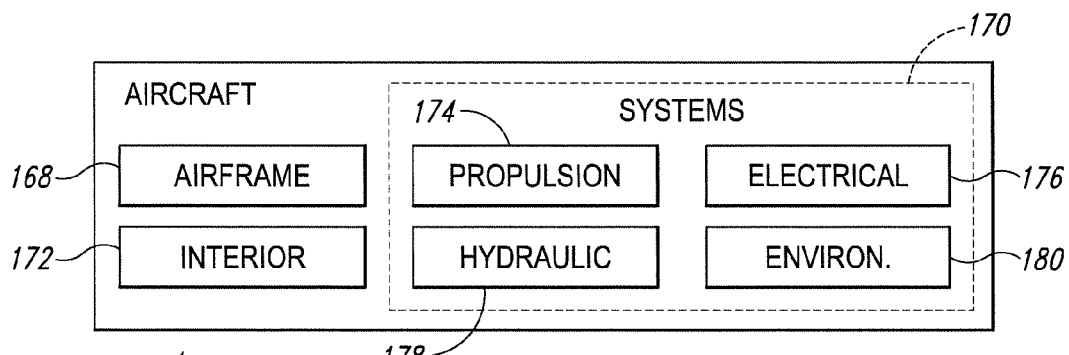
FIG. 17 is a block diagram of an aircraft.

Referring now to FIGS. 16-17, embodiments of the disclosure may be described in the context of an aircraft manufacturing and service method 150, as shown in FIG. 16, and an aircraft 152, as shown in FIG. 17 (which may include and/or be aircraft 100). During pre-production, exemplary method 150 may include specification and design 154 of the aircraft 152 and material procurement 156. During production, component and subassembly manufacturing 158 and system integration 160 of the aircraft 152 takes place. Thereafter, the aircraft 152 may go through certification and delivery 162 in order to be placed in service 164. While in service by a customer, the aircraft 152 is scheduled for routine maintenance and service 166 (which may also include modification, reconfiguration, refurbishment, and so on).

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 17, the aircraft 152 produced by exemplary method 150 may include an airframe 168 with a plurality of systems 170 and an interior 172. Examples of high-level systems 170 include one or more of a propulsion system 174, an electrical system 176, a hydraulic system 178, and an environmental system 180. Any number of other systems may be included. Although an aerospace example is shown, the principles of the invention may be applied to other industries, such as the automotive industry.

Apparatus and methods embodied herein may be employed during any one or more of the stages of the production and service method 150. For example, components or subassemblies corresponding to production process 158 may be fabricated or manufactured in a manner similar to components or subassemblies produced while the aircraft 152 is in service. Also, one or more apparatus embodiments, method embodiments, or a combination thereof may be utilized during the production stages 158 and 160, for example, by substantially expediting assembly of or reducing the cost of an aircraft 152. Similarly, one or more of apparatus embodiments, method embodiments, or a combination thereof may be utilized while the aircraft 152 is in service, for example and without limitation, to maintenance and service 166.

Illustrative, non-exclusive examples of inventive subject matter according to the present disclosure are described in the following enumerated paragraphs:

A1. A method of assembling a skin of a composite structure on an outer surface of an inner mold line layup mandrel, the method comprising:
receiving a plurality of ply kits, wherein each ply kit of the plurality of ply kits includes a plurality of plies;
assembling the plurality of ply kits to form a skin segment that defines a portion of the skin, wherein the assembling includes:
transferring a respective ply kit of the plurality of ply kits to a non-planar transfer tool;
compacting the respective ply kit on the non-planar transfer tool; and
repeating the transferring and the compacting sequentially to layer each ply kit of the plurality of ply kits above a previous ply kit of the plurality of ply kits; and affixing the skin segment to the outer surface of the layup mandrel.

A2. The method of paragraph A1, wherein the assembling further includes locating the respective ply kit on a planar indexing surface prior to the transferring.

A3. The method of paragraph A2, wherein the assembling further includes at least one of inspecting the respective ply kit and aligning the respective ply kit while the respective ply kit is on the planar indexing surface.

A4. The method of any of paragraphs A1-A3, wherein the respective ply kit is attached to a respective ply carrier sheet, optionally wherein the receiving the plurality of ply kits includes receiving the respective ply carrier sheet with the respective ply kit, and further optionally wherein the method further includes attaching the respective ply kit to the respective ply carrier sheet.

A5. The method of paragraph A4 when dependent from paragraph A2, wherein the locating includes locating the respective ply carrier sheet between the plurality of plies and the planar indexing surface.

A6. The method of paragraph A4, wherein the transferring includes flipping the respective ply kit such that the plurality of plies is located between the respective ply carrier sheet and the non-planar transfer tool.

A7. The method of any of paragraphs A1-A6, wherein the receiving includes simultaneously receiving at least two of the plurality of ply kits.

A8. The method of any of paragraphs A1-A7, wherein the receiving further includes receiving an additional ply kit that includes only one ply.

A9. The method of any of paragraphs A1-A8, wherein the plurality of plies includes a plurality of stacked plies, and optionally wherein the receiving includes receiving the plurality of stacked plies.

A10. The method of any of paragraphs A1-A9, wherein the receiving includes forming the plurality of ply kits.

A11. The method of paragraph A10, wherein the forming includes constructing each ply kit of the plurality of ply kits on a/the respective ply carrier sheet, optionally wherein the constructing includes layering the plurality of plies on top of one another to form a/the plurality of stacked plies.

A12. The method of any of paragraphs A10-A11, wherein the forming includes forming the plurality of ply kits on a planar layup bed, optionally wherein the planar layup bed includes a/the planar indexing surface.

A13. The method of any of paragraphs A10-A12, wherein the forming includes concurrently forming at least two ply kits of the plurality of ply kits.

A14. The method of any of paragraphs A10-A13, wherein the forming includes maintaining a thickness of each ply kit of the plurality of ply kits below a threshold thickness, and optionally wherein, when the thickness of each ply kit is below the threshold thickness, each ply kit will not buckle when bent to a radius of curvature that is greater than a threshold buckling radius of curvature.

A15. The method of any of paragraphs A10-A14, wherein the forming includes maintaining a number of plies within each ply kit of the plurality of ply kits below a threshold number of plies, and optionally wherein, when the number of plies is less than the threshold number of plies, each ply kit will not buckle when bent to a/the radius of curvature that is greater than a/the threshold buckling radius of curvature.

A16. The method of any of paragraphs A14-A15, wherein the threshold buckling radius of curvature includes a radius of curvature of at least one of:
(i) greater than 0.25 meters (m), greater than 0.5 m, greater than 0.75 m, greater than 1 m, greater than 1.25 m, greater than 1.5 m, greater than 1.75 m, greater than 2 m, greater than 2.25 m, greater than 2.5 m, greater than 2.75 m, or greater than 3 m; and
(ii) less than 4 m, less than 3.75 m, less than 3.5 m, less than 3.25 m, less than 3 m, less than 2.75 m, less than 2.5 m, less than 2.25 m, less than 2 m, less than 1.75 m, less than 1.5 m, less than 1.25 m, or less than 1 m.

A17. The method of any of paragraphs A1-A16, wherein the assembling the plurality of ply kits includes assembling at least 2, at least 3, at least 4, at least 5, at least 6, at least 7, at least 8, at least 9, at least 10, at least 12, at least 14, at least 16, at least 18, or at least 20 ply kits.

A18. The method of any of paragraphs A1-A17, wherein the assembling the plurality of ply kits includes assembling the plurality of ply kits such that the skin segment includes at least 20, at least 25, at least 30, at least 35, at least 40, at least 45, at least 50, at least 55, at least 60, at least 65, at least 70, at least 75, or at least 80 stacked plies.

A19. The method of any of paragraphs A1-A18, wherein the plurality of plies includes at least 2, at least 3, at least 4, at least 6, at least 8, at least 10, at least 12, at least 15, at least 20, or at least 25 plies.

A20. The method of any of paragraphs A1-A19, wherein the transferring includes conforming a shape of the respective ply kit to a shape of an upper surface of the non-planar transfer tool, optionally wherein the upper surface of the non-planar transfer tool includes at least one of a non-planar shape, concave shape, a contoured shape, and a shape that defines at least one curve.

A21. The method of paragraph A20, wherein the conforming further includes conforming each ply of the plurality of plies to the shape of the upper surface of the non-planar transfer tool.

A22. The method of any of paragraphs A20-A21, wherein the assembling further includes selecting the shape of the upper surface of the non-planar transfer tool, optionally wherein the selecting includes selecting based, at least in part, on a shape of the outer surface of the layup mandrel.

A23. The method of paragraph A22, wherein the selecting includes placing at least one shim on the non-planar transfer tool to define at least a portion of the upper surface of the non-planar transfer tool prior to the transferring.

A24. The method of any of paragraphs A22-A23, wherein the selecting includes selecting a specific non-planar transfer tool from a plurality of non-planar transfer tools.

A25. The method of any of paragraphs A1-A24, wherein, prior to transferring a first ply kit of the plurality of ply kits to the non-planar transfer tool, the method further includes placing a skin segment carrier sheet on the non-planar transfer tool, and optionally wherein, subsequent to the assembling, the skin segment carrier sheet is located between the non-planar transfer tool and the plurality of ply kits that form the skin segment.

A26. The method of any of paragraphs A1-A25, wherein the transferring includes bending the respective ply kit to a transfer radius of curvature that is less than a radius of curvature of a/the upper surface of the non-planar transfer tool, optionally wherein the radius of curvature of the upper surface of the non-planar transfer tool is at least one of:

(i) greater than 0.5 meter (m), greater than 0.75 m, greater than 1 m, greater than 1.25 m, greater than 1.5 m, greater than 1.75 m, greater than 2 m, greater than 2.25 m, greater than 2.5 m, greater than 2.75 m, greater than 3 m, or greater than 3.25 m; and (ii) less than 4.5 m, less than 4 m, less than 3.75 m, less than 3.5 m, less than 3 m, less than 2.75 m, less than 2.5 m, less than 2.25 m, less than 2 m, less than 1.75 m, or less than 1.5 m.

A27. The method of any of paragraphs A1-A26, wherein the transferring includes bending the respective ply kit to a/the transfer radius of curvature that is greater than a/the threshold buckling radius of curvature for the respective ply kit.

A28. The method of any of paragraphs A1-A27, wherein the compacting includes vacuum compacting the respective ply kit.

A29. The method of any of paragraphs A1-A28, wherein the assembling further includes removing a/the ply carrier sheet from the respective ply kit prior to transferring a subsequent ply kit of the plurality of ply kits to the non-planar transfer tool.

A30. The method of any of paragraphs A1-A29, wherein, prior to the affixing, the method further includes applying an adhesive to at least one of the outer surface of the layup mandrel and an upper surface of the skin segment, optionally wherein the adhesive includes at least one adhesive strip, and further optionally wherein, subsequent to the affixing, the method further includes retaining the skin segment on the outer surface of the layup mandrel with the adhesive.

A31. The method of any of paragraphs A1-A30, wherein, prior to the affixing, the method further includes aligning the non-planar transfer tool with the layup mandrel, optionally wherein the aligning includes positioning the non-planar transfer tool vertically below the layup mandrel, and further optionally wherein the aligning includes aligning with one or more alignment pins.

A32. The method of any of paragraphs A1-A31, wherein the affixing includes contacting the skin segment with the layup mandrel, optionally wherein the contacting includes moving the non-planar transfer tool and the layup mandrel toward one another, optionally wherein the moving includes raising the non-planar transfer tool, and further optionally wherein the moving includes lowering the layup mandrel.

A33. The method of any of paragraphs A1-A32, wherein the affixing further includes compressing the skin segment against the layup mandrel.

A34. The method of paragraph A33, wherein the compressing includes pressurizing a plurality of compaction bladders to press the skin segment against the outer surface of the layup mandrel.

A35. The method of paragraph A34, wherein the pressurizing includes sequentially pressurizing the plurality of compaction bladders, optionally wherein the sequentially pressurizing includes pressurizing a central compaction bladder that is located between two or more outer compaction bladders prior to pressurizing the two or more outer compaction bladders.

A36. The method of any of paragraphs A34-A35, wherein the compressing further includes maintaining a pressure within each of the plurality of compaction bladders below a threshold upper compaction bladder pressure.

A37. The method of any of paragraphs A33-A36, wherein the compressing includes vacuum compacting the skin segment to the outer surface of the layup mandrel.

A38. The method of any of paragraphs A1-A37, wherein the skin segment defines the entire skin.

A39. The method of any of paragraphs A1-A38, wherein the skin is defined by a plurality of skin segments.

A40. The method of paragraph A39, wherein the outer surface of the layup mandrel defines a plurality of surface regions, and further wherein the method includes repeating the method to affix a respective skin segment of the plurality of skin segments to each region of the plurality of surface regions.

A41. The method of paragraph A40, wherein the repeating includes forming a plurality of interfaces between adjacent pairs of skin segments of the plurality of skin segments, and optionally wherein the plurality of interfaces include at least one of a plurality of overlapping joints, a plurality of scarf joints, and a plurality of splice joints.

A42. The method of any of paragraphs A39-A41, wherein the plurality of skin segments includes a plurality of gores.

A43. The method of any of paragraphs A39-A42, wherein each skin segment of the plurality of skin segments defines a portion of an outer perimeter of the composite structure, optionally wherein the portion of the outer perimeter includes less than 50%, less than 40%, less than 30%, less than 25%, less than 20%, less than 15%, or less than 10% of the outer perimeter of the composite structure.

A44. The method of any of paragraphs A39-A43, wherein the plurality of skin segments includes at least 2, at least 3, at least 4, at least 5, at least 6, at least 8, or at least 10 skin segments.

A45. The method of any of paragraphs A1-A44, wherein the composite structure further includes a plurality of stringers.

A46. The method of paragraph A45, wherein the method further includes forming at least a portion of the plurality of stringers at least partially concurrently with forming at least a portion of the plurality of ply kits.

A47. The method of any of paragraphs A45-A46, wherein the method further includes affixing the plurality of stringers to the outer surface of the layup mandrel, and optionally wherein at least a portion of the plurality of stringers is affixed to the layup mandrel prior to the affixing the skin segment to the outer surface of the layup mandrel.

A48. The method of any of paragraphs A1-A47, wherein the method further includes curing the composite structure, optionally wherein the curing includes annealing the composite structure, optionally wherein the annealing includes annealing in an autoclave, and further optionally wherein the annealing includes annealing for at least 4 hours, at least 5 hours, at least 6 hours, at least 7 hours, at least 8 hours, at least 9 hours, or at least 10 hours.

A49. The method of any of paragraphs A1-A48, wherein the composite structure includes at least one of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

A50. The method of any of paragraphs A1-A49, wherein the outer surface of the layup mandrel defines a contour of an inner surface of at least one of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

B1. A system for assembling a composite structure, the system comprising:
  a supply of ply kits, wherein each ply kit in the supply of ply kits includes a plurality of plies of a composite material;
  a skin segment assembly system, wherein the skin segment assembly system includes:
    a non-planar transfer tool that is configured to simultaneously support at least two ply kits from the supply of ply kits on a non-planar upper surface thereof; and
    a compaction tool that is configured to compact the at least two ply kits on the non-planar transfer tool to form a skin segment; and a layup mandrel that is configured to receive the skin segment on an outer surface thereof.

B2. The system of paragraph B1, wherein the skin segment assembly system further includes a planar indexing surface that is configured to support each of the at least two ply kits prior to the at least two ply kits being supported on the non-planar upper surface of the non-planar transfer tool.

B3. The system of paragraph B2, wherein the skin segment assembly system further includes a conveyance tool that is configured to transfer a respective ply kit of the at least two ply kits from the planar indexing surface to the non-planar upper surface of the non-planar transfer tool.

B4. The system of any of paragraphs B1-B3, wherein the skin segment assembly system further includes a/the conveyance tool that is configured to transfer a respective ply kit of the at least two ply kits to the non-planar upper surface of the non-planar transfer tool.

B5. The system of any of paragraphs B3-B4, wherein the conveyance tool is configured to bend the respective ply kit to a transfer radius of curvature that is less than a radius of curvature of the non-planar upper surface of the non-planar transfer tool, optionally wherein the radius of curvature of the non-planar upper surface of the non-planar transfer tool is at least one of:
  (i) greater than 0.5 meter (m), greater than 0.75 m, greater than 1 m, greater than 1.25 m, greater than 1.5 m, greater than 1.75 m, greater than 2 m, greater than 2.25 m, greater than 2.5 m, greater than 2.75 m, greater than 3 m, or greater than 3.25 m;
  (ii) less than 4.5 m, less than 4 m, less than 3.75 m, less than 3.5 m, less than 3 m, less than 2.75 m, less than 2.5 m, less than 2.25 m, less than 2 m, less than 1.75 m, or less than 1.5 m; and
  (iii) greater than a buckling radius of curvature for the respective ply kit.

B6. The system of any of paragraphs B3-B5, wherein the conveyance tool is configured to transfer a first ply kit of the at least two ply kits to the non-planar upper surface of the non-planar transfer tool and to subsequently transfer a second ply kit of the at least two ply kits to the non-planar upper surface of the non-planar transfer tool to form a stack of ply kits that includes at least the first ply kit and the second ply kit.

B7. The system of any of paragraphs B1-B6, wherein the system further includes a ply kit supply system, wherein the ply kit supply system includes a planar layup bed that is configured to support a respective ply kit of the supply of ply kits during assembly thereof and a layup head that is configured to locate a respective ply of the plurality of plies within the respective ply kit during assembly of the respective ply kit.

B8. The system of paragraph B7, wherein the ply kit supply system further includes a conveyance structure that is configured to convey the respective ply kit of the plurality of ply kits from the ply kit supply system to the skin segment assembly system.

B9. The system of any of paragraphs B1-B8, wherein the system further includes a supply of stringers, and further wherein the layup mandrel further includes at least one channel that is configured to receive at least one stringer from the supply of stringers.

B10. The system of paragraph B9, wherein the system further includes the composite structure, wherein the composite structure includes the skin segment and the at least one stringer, and further wherein the skin segment is operatively attached to the at least one stringer.

B11. The system of any of paragraphs B1-B10, wherein each ply kit in the supply of ply kits is operatively attached to a respective ply carrier sheet, and optionally wherein the respective ply carrier sheet is configured to be removed from the ply kit during assembly of the skin segment.

B12. The system of any of paragraphs B1-B11, wherein each ply kit in the supply of ply kits defines a ply kit thickness, and further wherein the ply kit thickness is below a threshold thickness below which the ply kit will not buckle when bent to a radius of curvature that is greater than a/the threshold buckling radius of curvature.

B13. The system of paragraph B12, wherein the threshold buckling radius of curvature is at least one of:
  (i) greater than 0.25 meters (m), greater than 0.5 m, greater than 0.75 m, greater than 1 m, greater than 1.25 m, greater than 1.5 m, greater than 1.75 m, greater than 2 m, greater than 2.25 m, greater than 2.5 m, greater than 2.75 m, or greater than 3 m; and
  (ii) less than 4 m, less than 3.75 m, less than 3.5 m, less than 3.25 m, less than 3 m, less than 2.75 m, less than 2.5 m, less than 2.25 m, less than 2 m, less than 1.75 m, less than 1.5 m, less than 1.25 m, or less than 1 m.

B14. The system of any of paragraphs B1-B13, wherein the compaction tool is a vacuum compaction tool.

B15. The system of any of paragraphs B1-B14, wherein the skin segment is a second skin segment, and further wherein the system includes a first skin segment that is operatively attached to the outer surface of the layup mandrel.

B16. The system of paragraph B15, wherein the system further includes an adhesive that is located between the first skin segment and the outer surface of the layup mandrel and retains the first skin segment on the outer surface of the layup mandrel.

B17. The system of any of paragraphs B1-B16, wherein the non-planar transfer tool further includes at least one shim that is configured to define at least a portion of a/the shape of the non-planar upper surface thereof.

B18. The system of any of paragraphs B1-B17, wherein the non-planar transfer tool further includes at least one compaction bladder, wherein the compaction bladder is configured to be inflated to press the skin segment into contact with the outer surface of the layup mandrel.

B19. The system of any of paragraphs B1-B18, wherein the system includes the composite structure.

B20. The system of paragraph B19, wherein the composite structure includes a plurality of skin segments, and optionally wherein the plurality of skin segments includes at least 2, at least 3, at least 4, at least 5, at least 6, at least 8, or at least 10 skin segments.

B21. The system of paragraph B20, wherein the plurality of skin segments includes a plurality of gores.

B22. The system of any of paragraphs B1-B21, wherein the composite structure includes at least one of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

B23. The system of any of paragraphs B1-B22, wherein the outer surface of the layup mandrel defines a contour of an inner surface of at least one of an aircraft, a portion of an aircraft, an airframe, a portion of an airframe, a fuselage, a portion of a fuselage, a fuselage barrel, a portion of a fuselage barrel, a wing, a portion of a wing, a stabilizer, and a portion of a stabilizer.

B24. The system of any of paragraphs B1-B23, wherein a shape of the non-planar upper surface of the non-planar transfer tool corresponds to a shape of the outer surface of the layup mandrel.

B25. The system of any of paragraphs B1-B24, wherein the at least two ply kits includes at least 3, at least 4, at least 5, at least 6, at least 7, at least 8, at least 9, at least 10, at least 12, at least 14, at least 16, at least 18, or at least 20 ply kits.

B26. The system of any of paragraphs B1-B25, wherein the plurality of plies includes at least 2, at least 3, at least 4, at least 6, at least 8, at least 10, at least 12, at least 15, at least 20, or at least 25 plies.

B27. The system of any of paragraphs B1-B26, wherein the layup mandrel is configured to be removed from the composite structure subsequent to formation of the composite structure.

B28. The system of any of paragraphs B1-B27, wherein the non-planar transfer tool is configured to sequentially receive each ply kit of the at least two ply kits on the non-planar upper surface thereof.

C1. A kit of components that is configured to be assembled to form a composite structure, the kit comprising:
the system of any of paragraphs B1-B28.

D1. The use of any of the methods of any of paragraphs A1-A50 with any of the systems of any of paragraphs B1-B28 or the kit of paragraph C1.

D2. The use of any of the systems of any of paragraphs B1-B28 or the kit of paragraph C1 with any of the methods of any of paragraphs A1-A50.

D3. The use of any of the methods of any of paragraphs A1-A50, any of the systems of any of paragraphs B1-B28, or the kit of paragraph C1 to construct at least a portion of a composite structure.

D4. The use of any of the methods of any of paragraphs A1-A50, any of the systems of any of paragraphs B1-B28, or the kit of paragraph C1 to affix a plurality of planar ply kits to an outer surface of a non-planar layup mandrel to produce a skin of a composite structure.

D5. The use of a plurality of planar ply kits to produce a non-planar skin of a composite structure.

D6. The use of a non-planar transfer tool to affix a non-planar skin of a composite structure to an outer surface of an inner mold line layup mandrel.

D7. A composite structure constructed using the method of any of paragraphs A1-A50.

D8. The composite structure of paragraph B5, wherein the composite structure includes at least one of an aircraft, a portion of an aircraft, an airframe, a portion of an airframe, a fuselage, a portion of a fuselage, a fuselage barrel, a portion of a fuselage barrel, a wing, and a portion of a wing.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method of assembling a skin of a composite structure on an outer surface of an inner mold line layup mandrel, the method comprising:
receiving a plurality of ply kits, wherein each ply kit of the plurality of ply kits includes a plurality of plies;
assembling the plurality of ply kits to form a skin segment that defines a portion of the skin, wherein the assembling includes:
transferring a respective ply kit of the plurality of ply kits to a non-planar transfer tool, wherein the transferring includes conforming a shape of the respective ply kit to a shape of an upper surface of the non-planar transfer tool, wherein the upper surface of the non-planar transfer tool defines a non-planar shape, and further wherein the transferring includes bending the respective ply kit to a transfer radius of curvature that is less than a radius of curvature of the upper surface of the non-planar transfer tool and greater than a threshold buckling radius of curvature for the respective ply kit;

compacting the respective ply kit on the non-planar transfer tool; and repeating the transferring and the compacting sequentially to layer each ply kit of the plurality of ply kits above a previous ply kit of the plurality of ply kits; and affixing the skin segment to the outer surface of the layup mandrel.

2. The method of claim 1, wherein the assembling further includes locating the respective ply kit on a planar indexing surface prior to the transferring.

3. The method of claim 2, wherein the respective ply kit is attached to a respective ply carrier sheet, wherein the locating includes locating the respective ply carrier sheet between the plurality of plies and the planar indexing surface, and further, wherein the transferring includes flipping the respective ply kit such that the plurality of plies is located between the respective ply carrier sheet and the non-planar transfer tool.

4. The method of claim 1, wherein the receiving includes simultaneously receiving at least two ply kits of the plurality of ply kits.

5. The method of claim 1, wherein the receiving includes forming the plurality of ply kits.

6. The method of claim 5, wherein the forming includes forming the plurality of ply kits on a planar layup bed.

7. The method of claim 5, wherein the forming includes concurrently forming at least two ply kits of the plurality of ply kits.

8. The method of claim 5, wherein the forming includes maintaining a thickness of each ply kit of the plurality of ply kits below a threshold thickness, and further wherein, when the thickness of each ply kit is below the threshold thickness, each ply kit will not buckle when bent to a radius of curvature that is greater than a threshold buckling radius of curvature, wherein the threshold buckling radius of curvature is greater than 0.25 m and less than 4 m.

9. The method of claim 1, wherein the assembling further includes selecting the shape of the upper surface of the non-planar transfer tool based, at least in part, on a shape of the outer surface of the layup mandrel.

10. The method of claim 1, wherein the compacting includes vacuum compacting the respective ply kit.

11. The method of claim 1, wherein, prior to the affixing, the method further includes applying an adhesive to at least one of the outer surface of the layup mandrel and an upper surface of the skin segment, and further wherein, subsequent to the affixing, the method further includes retaining the skin segment on the outer surface of the layup mandrel with the adhesive.

12. The method of claim 1, wherein the affixing further includes compressing the skin segment against the outer surface of the layup mandrel by pressurizing a plurality of compaction bladders to press the skin segment against the outer surface of the layup mandrel, wherein the pressurizing includes sequentially pressurizing the plurality of compaction bladders by pressurizing a central compaction bladder that is located between two or more outer compaction bladders prior to pressurizing the two or more outer compaction bladders.

13. The method of claim 1, wherein the skin is defined by a plurality of skin segments, wherein the outer surface of the layup mandrel defines a plurality of surface regions, and further wherein the method includes repeating the method to affix another skin segment of the plurality of skin segments to another region of the plurality of surface regions.

14. The method of claim 13, wherein the repeating includes forming a plurality of interfaces between adjacent pairs of skin segments of the plurality of skin segments, wherein the plurality of interfaces include at least one of a plurality of overlapping joints, a plurality of scarf joints, and a plurality of splice joints.

15. The method of claim 1, wherein the composite structure further includes a plurality of stringers, wherein the method includes forming at least a portion of the plurality of stringers at least partially concurrently with forming at least a portion of the plurality of ply kits, and further wherein the method includes affixing the plurality of stringers to the outer surface of the layup mandrel.

16. The method of claim 1, wherein the composite structure includes at least one of an aircraft, a portion of an aircraft, an airframe, a portion of an airframe, a fuselage, a portion of a fuselage, a fuselage barrel, a portion of a fuselage barrel, a wing, and a portion of a wing.

17. The method of claim 1, wherein the upper surface of the non-planar transfer tool is concave.

18. The method of claim 1, wherein the transferring includes initially contacting the respective ply kit with a central region of the upper surface of the non-planar transfer tool and subsequently contacting the respective ply kit with an edge region of the upper surface of the non-planar transfer tool.

19. A method of assembling a skin of a composite structure on an outer surface of an inner mold line layup mandrel, the method comprising:

receiving a plurality of ply kits, wherein each ply kit of the plurality of ply kits includes a plurality of plies;

assembling the plurality of ply kits to form a skin segment that defines a portion of the skin, wherein the assembling includes:

locating a respective ply kit of the plurality of ply kits on a planar indexing surface, wherein the respective ply kit is attached to a respective ply carrier sheet, and further wherein the locating includes locating the respective ply carrier sheet between the plurality of plies and the planar indexing surface;

transferring the respective ply kit to a non-planar transfer tool, wherein the transferring includes flipping the respective ply kit such that the plurality of plies is located between the respective ply carrier sheet and the non-planar transfer tool;

compacting the respective ply kit on the non-planar transfer tool; and repeating the transferring and the compacting sequentially to layer each ply kit of the plurality of ply kits above a previous ply kit of the plurality of ply kits; and affixing the skin segment to the outer surface of the layup mandrel.

20. The method of claim 19, wherein the transferring includes bending the respective ply kit to a transfer radius of curvature that is less than a radius of curvature of an upper surface of the non-planar transfer tool.

* * * * *